United States Patent
Liao et al.

(10) Patent No.: US 11,117,347 B2
(45) Date of Patent: Sep. 14, 2021

(54) RELEASE FILM FOR HIGH-CAPACITY MULTILAYER CERAMIC CAPACITOR AND PRODUCTION METHOD THEREOF

(71) Applicant: NAN YA PLASTICS CORPORATION, Taipei (TW)

(72) Inventors: Te-Chao Liao, Taipei (TW); Sen-Huang Hsu, Taipei (TW); Chao-Quan Wu, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 129 days.

(21) Appl. No.: 16/664,208

(22) Filed: Oct. 25, 2019

(65) Prior Publication Data

US 2020/0171791 A1 Jun. 4, 2020

(30) Foreign Application Priority Data

Dec. 4, 2018 (TW) .................................. 107143496

(51) Int. Cl.
*B32B 7/06* (2019.01)
*B32B 27/36* (2006.01)
*B32B 27/08* (2006.01)

(52) U.S. Cl.
CPC ................ *B32B 7/06* (2013.01); *B32B 27/08* (2013.01); *B32B 27/36* (2013.01); *B32B 2250/244* (2013.01); *B32B 2255/10* (2013.01); *B32B 2255/26* (2013.01)

(58) Field of Classification Search
CPC ............ B32B 7/06; B32B 27/36; B32B 27/08
USPC .......................................................... 428/480
See application file for complete search history.

(56) References Cited

U.S. PATENT DOCUMENTS

| | | | |
|---|---|---|---|
| 7,803,452 B2 * | 9/2010 | Takahashi | B32B 27/36 428/212 |
| 2006/0222814 A1 * | 10/2006 | Takahashi | B32B 7/06 428/141 |
| 2016/0039992 A1 | 2/2016 | Pranay | |
| 2017/0037210 A1 * | 2/2017 | Liao | C04B 35/62218 |
| 2020/0171791 A1 * | 6/2020 | Liao | B32B 7/06 |

FOREIGN PATENT DOCUMENTS

| | | |
|---|---|---|
| CN | 103917347 A | 7/2014 |
| CN | 103923334 A | 7/2014 |
| JP | 2008254207 A | 10/2008 |
| JP | 2017217901 A | 12/2017 |

* cited by examiner

*Primary Examiner* — Betelhem Shewareged
(74) *Attorney, Agent, or Firm* — Li & Cai Intellectual Property (USA) Office

(57) ABSTRACT

A release film for high-capacity multilayer ceramic capacitor (MLCC) 0.5-0.8 μm ceramic slurry and a production method thereof. The release film includes at least three layers of co-extruded polyester resin having a layer A, a layer B and a layer C, and stretching the same in longitudinal and transverse directions. In addition, the layer B includes recycled polyester resin, the layers A and C include new polyester resin raw materials, and a releasing agent having a phenyl releasing control agent. The production method for the release film includes coating a releasing agent on one or both sides of a polyester film, and winding into a roll after drying and hardening.

4 Claims, 1 Drawing Sheet

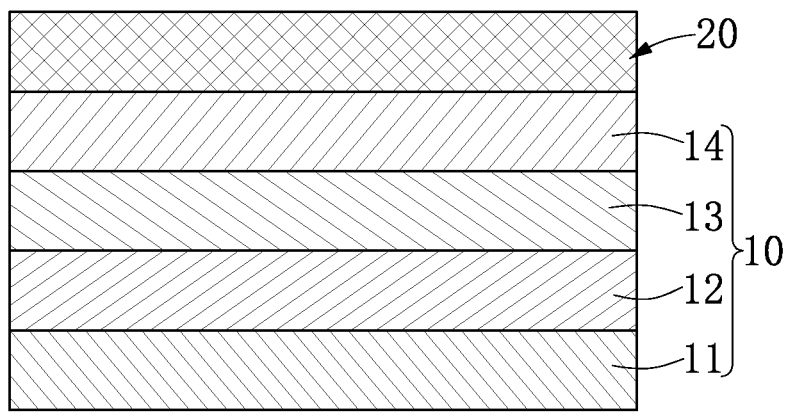

RELEASE FILM FOR HIGH-CAPACITY MULTILAYER CERAMIC CAPACITOR AND PRODUCTION METHOD THEREOF

CROSS-REFERENCE TO RELATED PATENT APPLICATION

This application claims the benefit of priority to Taiwan Patent Application No. 107143496, filed on Dec. 4, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a release film and its production method, the release film suitable for being applied to ceramic capacitor processing, and more particularly to multilayer ceramic capacitor processing. The technical feature of the present disclosure relates to three-layer or more-than-three-layer of co-extruded polyester resin and stretching the same in longitudinal and transverse directions to make a recycled polyester film, and then coating a releasing agent on at least one side of the polyester film which is continuously running on a coating machine. Then, the polyester film is wound into a roll after drying, irradiated with UV light and hardened, so as to make the surface flat and have a good coating properties and peelability. The present disclosure relates to release film, and more particularly to a release film suitable for use in the field of electronic manufacturing.

BACKGROUND OF THE DISCLOSURE

With the increasing awareness of environmental protection, a release film is developed toward being eco-friendly, and is made of four or more layers.

A polyester film produced with a recycled polyester resin is used as the middle layer of an eco-friendly release film, and the addition amount of the recycled polyester resin is 10%-95%, the preferred addition amount of the recycled polyester resin is 50%-90%, the best addition amount of the recycled polyester resin is 70%-85%. The surface of the polyester film is coated with a silicone resin releasing agent, and the eco-friendly release film which is continuously conveyed is manufactured by using heat hardening or UV hardening. The eco-friendly release film is particularly suitable for the coating and drying of thin ceramic pastes, which can be used to fabricate laminated ceramic capacitors by stacking 150 to 1000 layers.

The recycled polyester resin includes those from plastic bottles, PET plastic pellets and used release film for recycling. After recycling, it is cleaned, melted, filtered, granulated, and blended to reduce the heat history of the film and use of limited resources of the earth.

A coating machine coats a releasing agent on one side or both sides of the continuously transported polyester film to dry and harden it, and is wound into a roll-shaped release film, which is also called a release film, meaning a film with a peelable surface. The release film is not sticky or is slightly viscous when contacted with specific materials under limited conditions. At present, the products on the release film market generally use a PET film as a substrate, and the surface is coated with a release agent layer main body to protect the subsequent coating layer, and is torn and peeled off during use.

In the past, it was common to apply a ceramic slurry with a release film as a substrate so as to manufacture a laminated ceramic capacitor, however, recent production yields of high-capacitance or high-voltage laminated ceramic capacitors have been low. The main technical difficulties are not only the peelability of the ceramic slurry, but also the flatness and uniformity of the release film. These two factors affect the post-process processing characteristics and electrical yield of ceramic capacitors, which affect the normal use of their electronic circuits in subsequent processing or application.

During producing the ceramic capacitor electronic component, the ceramic slurry layer and the release film have a large peeling force, which easily causes the ceramic slurry layer to rupture, resulting in a decrease of production yield. The poor surface flatness of the previous products causes the ceramic paste to generate poor circuit signals after stacking, with the main reason being the unstable peeling ability.

Patent No. CN103917347 discloses forming a fluorine-containing release film material by using a co-extruded of ethylene-tetrafluoroethylene copolymer material so that the film itself has peelability. The film material can be directly used as a release material without coating the release layer on the surface of the film, and has the characteristics of high residual adhesion rate, low peeling force, and high surface brightness. However, the surface tension of the film is too low, the peeling force of the film is too small, and recoatability of the film is difficult.

Patent No. CN103923334 discloses a fluorosilicone film which is prepared from a silica sol, adding an acrylate monomer, a fluorine-containing monomer and a silicon-containing monomer, and processing free radical copolymerization to obtain a fluorine type silicone release agent, and the fluorine type silicone release agent and an isocyanate curing agent are mixed into a coating agent, applying the coating agent to a substrate, and then heat curing to obtain a fluorosilicone film. The fluorosilicone film has the advantages of high hydrophobicity, low peeling force and high residual adhesion rate.

U.S. Pat. No. 7,803,452B2 discloses a coating double-sided silicone resin, which can coat ceramic slurry on low rough surface and silicon oxide resin layer on the other side as an antistatic layer. If this technology is used for ceramic paste with high viscosity, the thin ceramic slurry and the release film have high adhesive force and high peeling force, which can easily cause the ceramic slurry to be broken.

Patent No. US20160039992A1 discloses a recycling and remanufacturing polyester film, using recycled polyester film, and recycling by coarse crushing, washing, filtering and so on in processing. By recycling PET polyester bottles, PET polyester film, PET biaxially stretched polyester film, and polyester fiber to strictly control the quality of recycled materials, and through coarse crushing, water washing and filtration processes, the amount of impurities circulating into the recycling system can be reduced.

SUMMARY OF THE DISCLOSURE

The object of the present disclosure is to provide a release film suitable for the electronics industry. The release film includes a release layer and a three-layer or multi-layer polyethylene terephthalate film, and has peel ability. The release film has good adhesion to a substrate, has a controlled peeling force, and the release layer has a high residual adhesion rate, and no free silicone resin remains on the surface, so as to have less impact on electronic circuits in subsequent use. After UV hardening molding in the coating step, the heat resistance, solvent resistance and weather resistance of the release film are significantly improved compared with the performance of the commercial release materials, so that it can have wider applicability.

Problem to be Solved

Recycled polyester film is remanufactured by using at least three layers of co-extruded polyester resin having a layer A, a layer B and a layer C, and stretching the same in longitudinal and transverse directions. The recycled polyester resin is added into the layer B to achieve maximum recycling efficiency, and new polyester resin raw material is added into the layers A and C to control the flatness and roughness.

In the layer A and the layer C, 0.12% of 50 nm $SiO_2$ and 0.3% of 1 μm $SiO_2$ are added to increase the slipperiness, thereby reducing scratches causes during the production of the PET polyester film.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

FIG. 1 is a cross-sectional view of a release film of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Referring to FIG. 1, a release film (or peeling film) 10 of the present disclosure includes a substrate, which is produced with a three-layer or multi-layer co-extruded polyester resin. The specific embodiment of the substrate includes a layer A 11, a layer B 12, a layer C 13, and a surface release layer 14; and one side or both sides of the substrate is coated with a release agent 20 to form a ceramic slurry layer. The thickness of the ceramic slurry layer depends on the capacitance of the multilayer laminated ceramic capacitor. When the capacitance of the high-capacity multilayer ceramic capacitor is 1 μF or more, the thickness of the ceramic paste layer is 0.5-1 μm. When the capacity of the medium-capacitance multilayer ceramic capacitor is 0.1-1 μF, the thickness of the ceramic slurry layer is 1-5 μm.

The substrate is produced with a polyethylene terephthalate film as a main material, and is manufactured by biaxial stretching and heat treatment, and generally has a thickness of 12-250 μm, preferably 19-75 μm, and most preferably 25-38 μm.

By adding a modified special formulation to the releasing agent, the one side or both-sides coating of the continuous-packaged polyester film can be dried by an oven, UV-cured, and then wound into a roll-shaped release film, so that the above-mentioned object can be achieved by performing such a production method.

The release film of the present disclosure adopts a UV hardening type release agent to achieve an ultra-low release force specification, and increases the hardness of the release layer by adding a trace amount of phenyl-containing material to achieve easy peeling with the ceramic slurry. The coating thickness of the modified UV release agent is generally between 0.05 and 1 μm, the preferred coating thickness is 0.08-0.5 μm, and the optimum coating thickness is 0.1-0.3 μm, which provides the best performance for the ceramic slurry peelability.

When the coating thickness of the post-processed ceramic slurry layer is as thin as 1.5 μm or less, the thin ceramic slurry and the substrate release film (release layer and PET film) may adsorb and adhere, such that poor peeling between the ceramic slurry layer and the substrate release film may occur.

In the past, the ceramic slurry coated on the release film was thicker, about 1.5 μm or more, so that cracking of the ceramic slurry layer and poor peeling rarely occur. However, in order to increase the number of laminated layers, it is necessary to laminate a large amount of a ceramic slurry film (about 300 layers or more) after coating and printing a thin ceramic slurry layer. Under this situation, if the substrate release film (release layer and PET film) is still rough, pores and broke dielectric layers may occur due to high surface roughness, resulting in deterioration of production yield. Therefore, the present disclosure provides for refilling of a newly produced polyester film intermediate recycled layer (the layer B) by using a recycled polyethylene terephthalate resin. When the recycled layer (the layer B) reaches a total thickness of 95% or more, the polyester film has poor flatness and uniformity, and it cannot be used for a polyester release film having a high flatness requirement, and cannot be applied to a ceramic slurry having a thickness of 1.5 μm or less. The production of a polyester film with a better flatness and a method for producing the same are achieved by the thickness of the layer B being 50%-90% of the total thickness. The production of a polyester film with an optimal flatness and a method for producing the same are achieved by the thickness of the layer B being 70%-85% of the total thickness.

Means for addressing the aforementioned problems: in view of the fact that the release film with a flat surface is easily peeled off from the ceramic slurry layer and to reduce the ceramic slurry broken due to partial protrusions, the present disclosure adopts a UV type silicone resin and adds a stereo structure of a phenyl group modifier to avoid causing protrusions during the coating process, to achieve the purpose of reducing peelability.

The present disclosure provides release film for high-capacity multilayer ceramic capacitor including a substrate and a releasing agent being coated on one side or both sides of the substrate. In addition, the releasing agent includes a special phenyl structure, and the composition of the releasing agent includes the following components: (The following % in the specification refers to wt %)
  a. 1.8-5% of a silicone resin;
  b. 0.01-0.3% of a photoinitiator;
  c. 94.2-98.1% of a solvent which has a butanone, a toluene and an xylene, of which the weight ratio is 50:40:10; and
  d. 0.09-0.5% of a modified phenyl auxiliary.

By adding a modified releasing control formulation to the releasing agent, the one side or both-sides coating of the continuous-packaged polyester film can be dried by an oven, UV-cured, and then wound into a roll-shaped release film, so that, the above-mentioned object can be achieved by performing such a production method. The polymer film thus formed has stable properties, stable release force, and does not change with time. The heat curing temperature of the present disclosure is 80-130° C., and the release film does not cause wrinkle deformation due to excessive temperature, nor become hard and brittle, which affects the texture. The following is a method of producing a release film for a high-capacity multilayer ceramic capacitor.

Firstly, the releasing agent is formulated according to the composition of the releasing agent described above:
  a. preparing the silicone resin (1.8-5%);
  b. adding the silicone resin into solvent (94.2-98.1%) and mixing evenly;
  c. adding the photoinitiator (0.01-0.3%) and stirring for 15 minutes; and
  d. adding the modified phenyl auxiliary (0.09-0.5%) and stirring for 15 minutes, and coating the releasing agent on one side or both sides of a polyester film which is continuously running on a coating machine.

Adding a modified phenyl releasing control agent into the releasing agent, heat-drying at 80-130° C. for 10-30 seconds, irradiating with UV light, and after drying and hardening, winding into a roll to make the surface flat and have a good coating properties and peelability.

In the releasing agent of the present disclosure, the silicone resin can be selected from the group consisting of acrylic graft silicone resin, epoxy graft silicone resin, and polydimethyl silicone resin. Further, polydimethyl siloxane resin has better release force and heat resistance. Polydimethylsiloxane resin has various structures, including terminal oxiranyl grafting, terminal and intermediate terminal oxiranyl grafting, in which ethylene oxide grafted polydimethylene is contained at the terminal and intermediate ends. Polydimethyl siloxane resin containing ethylene oxide grafted at the terminal and intermediate ends can be grafted with the release controlling agent of the present disclosure to achieve optimum release force. The main function of the photoinitiator is to promote the participation of the silicone resin in the hardening reaction. A good reaction can promote the hardening and film formation of the silicone resin, while a poorly reacted silicone resin cannot be hardened and filmed. The modified phenyl releasing control agent is added in an amount of 0.01-3%, and its characteristics for selection are described later.

The modified phenyl releasing control agent may be at least one selected from the group consisting of 1.1-diphenyloxirane, 2-(3,4-difluorophenyl) oxirane, and (4-fluorophenyl) oxirane. The modified phenyl releasing control agent has the best effect with 1.1-diphenylethylene oxide. The modified phenyl releasing control agent is added in an amount of 0.01-3%, and the effect is better when the amount is 0.02-2%, and the effect is best when the amount is 0.05-0.1%. Since the modified phenyl releasing control agent has two phenyl groups, the steric effect is better and the film hardness can be improved, thereby reducing the peeling force of the ceramic slurry and the silicone resin layer. When the added amount is more than 3% or less than 0.01%, the peeling force is not significantly lowered, and when the added amount is 0.05-0.1%, the peeling force can be lowered.

The present disclosure features a reactive releasing agent rather than a mixed releasing agent. In the releasing control agent added to the above-mentioned releasing agent, a phenyl group is grafted with an epoxy group of a silicone resin, which generates a molecule making the surface slippery and the releasing layer hard. Therefore, it has excellent peeling properties after coating of the ultra-thin ceramic slurry. If the amount of the releasing agent is more than 5%, the peeling layer may fall off and the surface roughness would be high, and the surface of the polyester film may not be completely filled. If the amount of the releasing agent is less than 0.1%, most of the linear silicone resin layer would be soft. When the ceramic slurry is peeled off, the friction coefficient is high, and scratches are easily generated in the production process.

In the production process of release film, high-efficiency ion wind equipment is used to reduce the chargeability of the release film, so as to achieve the purpose of reducing the peeling static of the coated ceramic slurry layer and the release film. When the film is dried and UV-cured, it is not easy to produce adsorption. The high-efficiency ion-eliminating device can be installed before the winding to eliminate excess charges on the surface of the releasing layer and the polyester layer A so as to achieve the purpose of neutralization.

The film substrate of the present disclosure can be selected from a polyester film, and depending on the amount of recycled polyester resin used, if transparency is required, the recycled amount of the polyester resin is less than 10%. If the use of optically illuminating applications is required, it is appropriate to use a polyester film with a recycled amount of more than 10% polyester resin and an inorganic pigment, and a biaxially stretched polyester film having a pigment such as $TiO_2$ or $SiO_2$ is more preferable.

In the present disclosure, the release agent formed in the release layer can preferably be a coating liquid containing a UV-curable silicone resin, and can be selected from polydimethylsiloxane resin, such as Shin-Etsu Corporation (KF-2005, X-62-7205, X-62-7028, X-62-7052, X-62-7622, X-62-7660, X-62-7655, Momentive UV9400, UV9500, Evonik RC722). Further, a releasing control agent can be added to the UV-curable silicone resin coating layer to impart a peeling property to the release film. This release layer is formed by applying a release agent containing an epoxy siloxane, which being processed drying and UV curing.

In the release film produced according to the present disclosure, a soft ceramic sheet is formed by, for example, forming a ceramic coating containing ceramic powder, an organic binder, a plasticizer, a solvent or the like thereon by a doctor blade method. It may also be screen printed thereon according to requirements to form electrodes such as those of palladium, silver, nickel, and so on. Next, after the release film is peeled off, the soft ceramic sheet is cut into an appropriate size to obtain a layered structure, and a soft ceramic chip is obtained through a shearing step.

The physical properties of the release film are measured by the following methods.

1. Haze Analysis (%)

The haze was measured by using an NDH7000 haze meter manufactured by NIPPON Co., Ltd., and by calculating the diffused light and the transmitted light.

2. Mean Roughness (Sa)

The mean roughness (Sa) is measured by optical microscopy using a non-contact surface roughness meter (Laser Microscope VK-X1000), and the measurement conditions are as follows:
(a) Magnification: 50×24.
(b) Length of measurement: 282 μm.
(c) Width of measurement: 247 μm.

3. Ten Point Height (Rz)

The ten point height (Rz) is the difference between the highest average of the top 5 points and the lowest average of the first 5 points.

4. Peeling Force Test

The standard Tesa 7475 test tape is attached to the release film surface, and a 20 g/cm$^2$ iron block is placed on the attached sample, and pressed at room temperature for 20 hours, and peeled off using a tensile machine (Guangzhou, QC508PA) at a machine speed of 300 mm/min and in a peel direction perpendicular to the ground with a peeling angle of 180 degrees, to measure the peel force.

5. The Interlayer Adhesion of the Release Film

The 2000 m long release film is rolled into the shape of a roll, and after aging at 60° C. for 1 month, the peeling phenomenon is observed on the releasing surface of the release film and the back thereof, and evaluated by the following criteria:
 ○: Non-sticky
 Δ: Slightly sticky
 x: Sticky 6. Production of Soft Ceramic Sheet When the step of coating the ceramic slurry on the release film to form the soft ceramic sheet is not performed well, the soft ceramic sheet would have issues in practical application, and is evaluated using the following criteria:
 x: The ceramic slurry will break, causing issues in practical application.
 Δ: The ceramic slurry occasionally breaks, causing issues in practical application.
 ○: No breakage occurs.

7. Peeling Static Electricity Between the Soft Ceramic Sheet and the Release Film

[Test Method for Peeling Static Electricity]

The soft ceramic sheet coated on the release film is cut into a size of 200 mm×200 mm, and the ceramic piece is sucked by a suction cup and peeled off from the release film, and the peeling static electricity of the release film is measured by an electrometer (SV-10) manufactured by Kasuga Electric Co., Ltd.

As described above, according to the present disclosure, it is possible to provide a release film which is excellent in surface flatness and has low peeling static electricity when peeled off from the ceramic slurry layer, and has high production yield and a method for producing the same.

[Preparation of Releasing Agent]

The composition of the releasing agent is as follows. After taking 94 g (1.88%) of X-62-7622 resin, 4900.06 g (98%) of solvent is added and stirred evenly, and then 0.94 g (0.019%) of the photoinitiator 7605E is added and stirred for 15 minutes, 5 g (0.1%) of the releasing control agent is added and stirred for 15 minutes to prepare a silicone resin solution having the silicone agent with a solid concentration of 2.0%.

EMBODIMENTS

The present disclosure is further illustrated by the following embodiments and comparative examples, but the scope of the invention is not limited to such embodiments.

First Embodiment

[Preparation of Polyester Film]

A recycled polyester film was made by three or more-than-three-layer of co-extruded polyester resin and stretching the same in longitudinal and transverse directions. The recycled polyester resin was added into the polyester layer B to achieve maximum recycling efficiency, and new polyester resin raw material was added into the polyester layers A and C to control the flatness and roughness of the polyester layers A and C. The extension ratio of the machine direction orientation (longitudinal direction) was 3.2, and the extension ratio of the transverse direction orientation (transverse direction) was 3.4. The sum of the thickness of layer A, layer B and layer C was 30 μm (3 μm of layer A, 24 μm of layer B and 3 μm of layer C), and heat setting temperature was 230° C.

[Preparation of Releasing Agent]

The composition is as follows, mixing 94 g (1.88%) of X-62-7622 resin with 4900.06 g (98%) of solvent uniformly, and then adding 0.94 g (0.019%) of the photoinitiator 7605E and stirring for 15 minutes, then adding 5 g (0.1%) of diphenyl releasing control agent and stirring for 15 minutes, so as to prepare a silicone resin solution having the silicone agent with a solid concentration of 2.0%:

The composition for preparing the releasing agent, including:
 1. 94 g of Siloxane, X-62-7622 (manufactured by Shin-Etsu Chemical Co., Ltd., 100% solid concentration);
 2. 0.94 g of photoinitiator, 7605E (manufactured by Shin-Etsu Chemical Co., Ltd.);
 3. 4900.06 g of MEK:toluene:xylene mixed solution (50:40:10 of weight ratio); and
 4. 5 g of diphenyl releasing control agent.

8 g/m$^2$ (Wet) coating amount of the above-mentioned composition of the releasing agent was applied to a polyethylene terephthalate film (PET) having a thickness of 30 μm by a bar coater, and then was dried at 130° C. for 30 seconds. Various releasing films are wound into a roll after irradiation of UV hardening reaction (200 mJ/cm$^2$, Fusion UV light). The obtained releasing film is excellent in flatness and is used for coating a thin ceramic slurry (0.8 μm). With the good peelability property of the release film and the ceramic slurry, the release film and the ceramic slurry have good peelability. The results of physical properties tests of the release film are shown in Table. 1.

Second Embodiment

As in the first embodiment, 0.2% diphenylethylene oxide releasing modifier was added in the releasing agent, and applied to a polyethylene terephthalate film (PET) having a thickness of 30 μm. The film was dried for 30 seconds at a heating temperature of 130° C. and conducted with a photo hardening reaction, and the film was then wound into a roll to obtain the release films. The physical properties tests of the release film are shown in Table. 1.

Third Embodiment

As in the first embodiment, 0.08% difluorophenyl oxirane releasing modifier was added in the releasing agent, and applied to a polyethylene terephthalate film (PET) having a thickness of 30 μm. The film was dried for 30 seconds at a heating temperature of 130° C. and conducted with a photo hardening reaction, and the film was then wound into a roll to obtain the release films. The physical properties tests of the release film are shown in Table. 1.

Fourth Embodiment

As in the first embodiment, 1.2% difluorophenyl oxirane releasing modifier was added in the releasing agent, and applied to a polyethylene terephthalate film (PET) having a thickness of 30 μm. The film was dried for 30 seconds at a heating temperature of 130° C. and conducted with a photo hardening reaction, and the film was then wound into a roll to obtain the release films. The physical properties tests of the release film are shown in Table. 1.

Fifth Embodiment

As in the first embodiment, 0.06% fluorophenyl oxirane releasing modifier was added in the releasing agent, and applied to a polyethylene terephthalate film (PET) having a thickness of 30 μm. The film was dried for 30 seconds at a heating temperature of 130° C. and conducted with a photo hardening reaction, and the film was then wound into a roll to obtain the release films. The physical properties tests of the release film are shown in Table. 1.

Sixth Embodiment

As in the first embodiment, 1.1% fluorophenyl oxirane releasing modifier was added in the releasing agent, and applied to a polyethylene terephthalate film (PET) having a thickness of 30 μm. The film was dried for 30 seconds at a heating temperature of 130° C. and conducted with a photo hardening reaction, and the film was then wound into a roll to obtain the release films. The physical properties tests of the release film are shown in Table. 1.

First Comparison Example

As in the first embodiment, a recycled polyester film was produced with a single layer polyester resin, and stretching the same in longitudinal and transverse directions. The recycled polyester resin was 100% added into the polyester layer B to achieve maximum recycling efficiency, and no new polyester resin raw material was added into the polyester layers A and C, which causes the poor flatness and roughness. The extension ratio of the machine direction orientation (longitudinal direction) was 3.2, and the extension ratio of the transverse direction orientation (transverse direction) was 3.4. The sum of the thickness of layer A, layer B and layer C was 30 μm (0 μm of layer A, 30 μm of layer B and 0 μm of layer C), and heat setting temperature was 230° C. The physical properties tests of the release film are shown in Table. 2.

Second Comparison Example

As in the first embodiment, a polyester film was produced with two layers of new polyester resin, and stretching the same in longitudinal and transverse directions. New polyester resin raw material was added into the polyester layers A and C, which have good flatness and roughness. The extension ratio of the machine direction orientation (longitudinal direction) was 3.2, and the extension ratio of the transverse direction orientation (transverse direction) was 3.4. The sum of the thickness of layer A, layer B and layer C was 30 μm (15 μm of layer A, 0 μm of layer B and 15 μm of layer C), and heat setting temperature was 230° C. The physical properties tests of the release film are shown in Table. 2.

Third Comparison Example

As in the first embodiment, a recycled polyester film was produced with three or more-than-three-layer of co-extruded polyester resin, and stretching the same in longitudinal and transverse directions. The recycled polyester resin was added into the polyester layer B and new polyester resin raw material was added into the polyester layers A and C. The extension ratio of the machine direction orientation (longitudinal direction) was 3.2, and the extension ratio of the transverse direction orientation (transverse direction) was 3.4. The sum of the thickness of layer A, layer B and layer C was 30 μm (6 μm of layer A, 18 μm of layer B and 6 μm of layer C), and heat setting temperature was 230° C.

0.6% diphenylethylene oxide releasing modifier was added in the releasing agent, and applied to a polyethylene terephthalate film (PET) having a thickness of 30 μm. The film was dried for 30 seconds at a heating temperature of 130° C. and conducted with a photo hardening reaction, and the film was then wound into a roll to obtain the release film. The physical properties tests of the release film are shown in Table. 2.

Fourth Comparison Example

As in the third comparison example, a recycled polyester film was produced with three or more-than-three-layer of co-extruded polyester resin, and stretching the same in longitudinal and transverse directions.

0.6% difluorophenyl oxirane releasing modifier was added in the releasing agent, and applied to a polyethylene terephthalate film (PET) having a thickness of 30 μm. The film was dried for 30 seconds at a heating temperature of 130° C. and conducted with a photo hardening reaction, and the film was then wound into a roll to obtain the release film. The physical properties tests of the release film are shown in Table. 2.

Fifth Comparison Example

As in the first embodiment, a recycled polyester film was produced with three or more-than-three-layer of co-extruded polyester resin, and stretching the same in longitudinal and transverse directions. The recycled polyester resin was added into the polyester layer B and new polyester resin raw material was added into the polyester layers A and C. The extension ratio of the machine direction orientation (longitudinal direction) was 3.2, and the extension ratio of the transverse direction orientation (transverse direction) was 3.4. The sum of the thickness of layer A, layer B and layer C was 30 μm (9 μm of layer A, 12 μm of layer B and 9 μm of layer C), and heat setting temperature was 230° C.

0.03% diphenylethylene oxide releasing modifier was added in the releasing agent, and applied to a polyethylene terephthalate film (PET) having a thickness of 30 μm. The film was dried for 30 seconds at a heating temperature of 130° C. and conducted with a photo hardening reaction, and the film was then wound into a roll to obtain the release film. The physical properties tests of the release film are shown in Table. 2.

Sixth Comparison Example

As in the fifth comparison example, a recycled polyester film was produced with three or more-than-three-layers of co-extruded polyester resin, and stretching the same in longitudinal and transverse directions. The recycled polyester resin was added into the polyester layer B and new polyester resin raw material was added into the polyester layers A and C.

2.5% difluorophenyl oxirane releasing modifier was added in the releasing agent, and applied to a polyethylene terephthalate film (PET) having a thickness of 30 μm. The film was dried for 30 seconds at a heating temperature of 130° C. and conducted with a photo hardening reaction, and the film was then wound into a roll to obtain the release film. The physical properties tests of the release film are shown in Table. 2.

Results and Discussion

The purpose of the present disclosure is to use the recycled polyester resin to refill into the intermediate layer of the newly produced polyester film. When the recycling layer (the layer B) reaches a thickness being 90% or more of a total thickness, the polyester film has poor flatness and thickness uniformity, and the polyester film cannot be used for a polyester release film having a high flatness requirement nor be applied to a ceramic slurry with a thickness of 1.5 μm or less. The production of a polyester film with a better flatness and a method for producing the same are achieved by the thickness of the layer B being 50%-90% of the total thickness. The production of a polyester film with a best flatness and a method for producing the same are achieved by the thickness of the layer B being 70%-85% of the total thickness. The less the amount of recovery, the less the recycling process is helped. In order to achieve low peeling force between the ceramic slurry and the release film, a modified phenyl releasing control agent P, 1.1-diphenylethylene oxide is added to the silicone resin layer; the modified phenyl releasing control agent Q, 2-(3,4-difluorophenyl)oxirane, and the modified phenyl releasing control agent R, (4-fluorophenyl)oxirane respectively were added into the silicone resin layer. Among them, the effect of diphenylethylene oxide is the optimal, and the phenyl stereo structure has the effect of light peeling on the peeled ceramic slurry, the effect of difluorophenyl is suboptimal, and the effect of fluorophenyl is insignificant.

TABLE 1

| | | Embodiments | | | | | |
| --- | --- | --- | --- | --- | --- | --- | --- |
| | | 1 | 2 | 3 | 4 | 5 | 6 |
| Substrate | Polyester layer C | 10% | 10% | 10% | 10% | 10% | 10% |
| | Polyester layer B | 80% | 80% | 80% | 80% | 80% | 80% |
| | Polyester layer A | 10% | 10% | 10% | 10% | 10% | 10% |
| Modified phenyl stripping control agent | Types | P | P | Q | Q | R | R |
| | Add amount | 0.1% | 0.2% | 0.08% | 1.2% | 0.06% | 1.1% |
| | Stereofunctional group | Diphenyl group | Diphenyl group | Difluorophenyl group | Difluorophenyl group | Fluorophenyl group | Fluorophenyl group |
| Haze(%) | | 8.6 | 8.7 | 8.7 | 8.7 | 8.7 | 8.7 |
| Mean roughness (Sa μm) | | 0.014 | 0.014 | 0.015 | 0.016 | 0.016 | 0.016 |
| Ten Point height (Sz μm) | | 0.201 | 0.235 | 0.256 | 0.284 | 0.317 | 0.318 |
| Peeling force (g/2.5 cm) | | 7.6 | 9.6 | 10.3 | 10.4 | 11.3 | 11.8 |
| The interlayer adhesion of the release film | | ○ | ○ | Δ | Δ | Δ | Δ |
| Thickness of soft ceramic sheet (μm) | | 0.8 | 0.8 | 0.8 | 0.8 | 0.8 | 0.8 |
| Production of soft ceramic sheet | | ○ | ○ | Δ | Δ | Δ | Δ |
| Peeling static electricity between the soft ceramic sheet and the release film (kV) | | 0.6 | 0.7 | 0.8 | 0.8 | 0.9 | 1 |

TABLE 2

| | | 比較例 | | | | | |
| --- | --- | --- | --- | --- | --- | --- | --- |
| | | 1 | 2 | 3 | 4 | 5 | 6 |
| Substrate | Polyester layer C | 0% | 50% | 20% | 20% | 30% | 30% |
| | Polyester layer B | 100% | 0% | 60% | 60% | 40% | 40% |
| | Polyester layer A | 0% | 50% | 20% | 20% | 30% | 30% |

TABLE 2-continued

| | | 比较例 | | | | | |
|---|---|---|---|---|---|---|---|
| | | 1 | 2 | 3 | 4 | 5 | 6 |
| Modified phenyl stripping control agent | Types | — | — | P | Q | P | Q |
| | Add amount | — | — | 0.6% | 2% | 0.03% | 2.5% |
| | Stereofunctional group | — | — | Diphenyl group | Difluorophenyl group | Diphenyl group | Difluorophenyl group |
| Haze(%) | | | 3.2 | 5.3 | 5.4 | 4.5 | 4.8 |
| Mean roughness (Sa μm) | | | 0.015 | 0.015 | 0.015 | 0.015 | 0.015 |
| Ten Point height (Sz μm) | | | 0.258 | 0.291 | 0.297 | 0.281 | 0.288 |
| Peeling force (g/2.5 cm) | | | 14.5 | 10.2 | 12.7 | 13.8 | 14.8 |
| The interlayer adhesion of the release film | | | x | Δ | Δ | Δ | Δ |
| Thickness of soft ceramic sheet (μm) | | | 0.8 | 0.8 | 0.8 | 0.8 | 0.8 |
| Production of soft ceramic sheet | | | x | Δ | Δ | Δ | Δ |
| Peeling static electricity between the soft ceramic sheet and the release film (kV) | | | 1.8 | 3.2 | 3.4 | 10.8 | 12.4 |

All percentages mentioned herein are by weight unless otherwise indicated. When a range of upper and lower ranges are provided, all combinations of the recited ranges are covered as if each combination is explicitly listed.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A release film for high-capacity multilayer ceramic capacitor, comprising:
   a substrate; and
   a releasing agent layer being coated on one side or both sides of the substrate;
   wherein the substrate is a three-layer or multi-layer co-extruded polyester resin laminated layer having a layer A, a layer B and a layer C;
   wherein the composition of the releasing agent includes the following components, and the sum of the weights of the following components is 100 wt %:
   a. 1.8-5 wt % of a silicone resin;
   b. 0.01-0.3 wt % of a photoinitiator;
   c. 94.2-98.1 wt % of a solvent which has a butanone, a toluene and an xylene, of which the weight ratio is 50:40:10; and
   d. 0.09-0.5 wt % of a modified phenyl releasing control agent.

2. The release film according to claim 1, wherein the layer B includes a recycled polyester resin and has a thickness being 50% to 90% of the total thickness of the substrate.

3. The release film according to claim 1, wherein the layer B includes a recycled polyester resin and has a thickness being 70% to 85% of the total thickness of the substrate.

4. A production method of release film for high-capacity multilayer ceramic capacitor, comprising:
   a. coating a releasing agent on one side or both sides of a polyester film which is continuously running on a coating machine, the coating thickness being controlled at 1-25 μm, and the releasing agent including the following components, with the sum of the weights of the following components being 100 wt %:
   1.8-5 wt % of a silicone resin;
   0.01-0.3 wt % of a photoinitiator;
   94.2-98.1 wt % of a solvent which has a butanone, a toluene and an xylene, of which the weight ratio is 50:40:10; and
   0.09-0.5 wt % of a modified phenyl auxiliaries; and
   b. adding a modified releasing auxiliary into the releasing agent, heat-drying at 80-130° C. for 10-30 seconds, irradiating with UV light, and after drying and hardening, winding into a roll so as to make the surface flat and have a good coating properties and peelability.

* * * * *